United States Patent [19]

D'Ambrosia et al.

[11] Patent Number: 4,903,009

[45] Date of Patent: Feb. 20, 1990

[54] INTRUSION DETECTION DEVICE

[75] Inventors: George C. D'Ambrosia, Penfield; Christopher A. Ludden, Fairport, both of N.Y.

[73] Assignee: Eastman Kodak Company, Rochester, N.Y.

[21] Appl. No.: 195,746

[22] Filed: May 18, 1988

[51] Int. Cl.$^4$ .............................................. G08B 13/18
[52] U.S. Cl. ..................................... 340/556; 250/221; 340/557
[58] Field of Search ............ 340/556, 557, 552; 250/221; 367/93; 342/27; 358/105, 108; 356/1; 354/403

[56] References Cited

U.S. PATENT DOCUMENTS

| | | | |
|---|---|---|---|
| 3,875,403 | 4/1975 | Svensson | 250/221 X |
| 4,242,743 | 12/1980 | Salem | 367/93 |
| 4,310,756 | 1/1982 | Sick et al. | 250/221 |
| 4,319,332 | 3/1982 | Mehnert | 340/556 X |
| 4,384,280 | 5/1983 | Haag | 340/556 |
| 4,514,625 | 4/1985 | Heiland | 250/221 |
| 4,521,106 | 6/1985 | Lambeth | 356/1 |
| 4,656,462 | 4/1987 | Araki et al. | 340/556 |

Primary Examiner—Glen R. Swann, III
Assistant Examiner—Thomas J. Mullen, Jr.
Attorney, Agent, or Firm—Robert L. Randall

[57] ABSTRACT

An intrusion detection device which comprises a radiation emitter arranged to project a beam of infrared radiation toward a field of view and means for receiving the radiation of the beam reflected from the field of view. The receiving means is arranged to generated a signal indicative of the distance from the device at which the beam has between reflected by the field of view during a selected time period. Means is also provided for storing a reference signal which is indicative of the distance of reflection of the beam from the field of view during a reference time period. Further means is provided for comparing a signal from a selected time period with the reference signal and for generating an output signal if the signal differs from the reference signal in a preselected manner.

23 Claims, 3 Drawing Sheets

INTRUSION DETECTION DEVICE

CROSS-REFERENCE TO RELATED APPLICATIONS

The present application is related to our co-pending applications entitled METHOD OF INTRUSION DETECTION, Ser. No. 195,747; A SCANNING INTRUSION DETECTION DEVICE, Ser. No. 195,741; and A METHOD OF INTRUSION DETECTION OVER A WIDE AREA, Ser. No. 195,748, all filed on even date herewith.

BACKGROUND OF THE INVENTION

1. Field of the Invention

The present invention relates to an intrusion detection device for detecting the presence and location of objects in space and, more particularly, to an active infrared system for actively locating objects in space by emitting a beam of infrared radiation into a field of view and measuring the distance from the device at which the beam is reflected by the field of view during a selected time period. The distance of the reflection is then compared to a reference signal, with an output signal being generated if the detected distance differs from the reference distance in a preselected manner.

2. Background Art

In recent years many forms of intrusion detection devices, or surveillance systems, have been developed to monitor an area or space, to protect against the entry of unauthorized personnel into that area or space, and to provide an alarm signal when such entry occurs. A variety of technologies have been applied to such intrusion detection systems in an attempt to obtain a satisfactory device that provides the requisite sensitivity to intrusion into the protected space without generating distracting, time-consuming, and costly false alarms. Such false alarms can result from changing environmental conditions, wind-blown debris, or the intrusion into the protected space of birds or other small animals. Among the technologies employed for intrusion detection systems of the prior art are those based on sonic or ultrasonic-acoustical detectors, photoelectric break-beam devices, passive infrared detectors, video systems, and radar or microwave-based systems.

The sonic, ultrasonic or acoustical devices are illustrated in U.S. Pat. Nos. 4,499,564, 4,382,291, 4,229,811 and 4,639,902. In the device disclosed in these patents the intrusion detection systems utilize an acoustical signal, either sonic or ultrasonic, which is transmitted into the space to be protected. The acoustical signal is reflected off of objects in the space or the walls forming the perimeter of the space and is collected by an acoustical receiver. The return signal represents the total reflected energy pattern for that space. A change in the signal received indicates some change in the space protected; however, these systems do not provide any means of identifying where, either directionally or distance-wise, in the protected space that the change has occurred. Thus, the only information derivable from such systems is whether or not such a change has occurred which then requires some form of follow-up by the security force. An additional limitation of systems of this type is that they are generally unacceptable in anything but a closed environment since they are subject to false alarms from naturally occurring sound changes such as generated by wind, thunder, or other naturally occurring sounds in an open environment.

The photoelectric break-beam devices are illustrated in U.S. Pat. Nos. 3,875,403, 4,239,961, 4,310,756, 4,384,280 and 4,514,625. In the devices disclosed, the intrusion detection system uses an active photo-beam projected into the area under surveillance. A detector sees the continuous beam at the opposite end of the detection zone. If the photo-beam is broken by an intruder, then an alarm is sounded. This type of system does not give any information above the distance of the intruder from the detector device. This system also requires two head units with the protection zone between them. This leads to a more complex installation than if only one unit is required.

Passive infrared detection technology is illustrated in U.S. Pat. Nos. 3,476,946, 3,476,947, 3,476,948 and 3,475,608. With systems such as these, changes in the infrared content of the light received by the device from the area under control is monitored and an alarm signal is generated if the infrared content changes. This is based on the presumption that the infrared content of the light will be affected by intruders, particularly individuals, entering into the controlled space. However, it has been found that such infrared detectors are falsely triggered by normal changes in the infrared content of the light in a space due to ordinary changes in the sun as well as the effects of clouds passing over the sun. Still further, such systems do not provide distance or direction information and thus require follow-up by security staff to determine the true nature of the cause that triggered the alarm.

The video based intrusion detection systems utilize a video camera to view an area under protection and are illustrated in U.S. Pat. Nos. 3,823,261; 3,932,703 and 4,408,224. Typically, the video signal is digitized and stored in a memory. Thereafter, the video signal is compared with a reference signal stored in the memory and, when a difference is detected, an alarm is sounded. These systems use changes in scene illumination to determine an alarm condition rather than changes in object distances and therefore, unless the space to be observed and protected is carefully controlled and isolated from changes in environmental illumination, such changes will result in false alarms. As a result, such a system is less than satisfactory for exterior spaces. Furthermore, the amount of data that is necessarily stored to obtain reasonable resolution of the image of the space being protected requires a significant quantity of expensive computer memory.

Systems employing radar or other microwave technology are illustrated in U.S. Pat. No. 4,197,537. In this particular system a single microwave signal source is used to bathe the space with microwave energy. A receiver detects the return signal reflected from the space being protected which can be compared with a reference signal to detect an intrusion thereinto. This particular system is unable to identify the precise location of the intruder. While other radar/microwave-based systems can provide such information, their cost is at least an order of magnitude greater than the cost of the other systems described above as well as that of the present invention.

Thus, an intrusion detection system which is both reasonably priced, sufficiently sensitive and yet relatively immune to false alarms would be very attractive to the security industry.

SUMMARY OF THE INVENTION

Accordingly, the present invention provides an intrusion detection device which comprises a radiation emitter arranged to project a beam of radiation toward a field of view and means for receiving the radiation of the beam reflected from the field of view. The receiving means is arranged to generate a signal indicative of the distance from the device at which the beam has been reflected by the field of view during a selected time period. Means is also provided for storing a reference signal which is indicative of the distance of reflection of the beam from the field of view during a reference time period. Further means is provided for comparing a signal from a selected time period with the reference signal and for generating an output signal if the signal differs from the reference signal in a preselected manner.

Moreover, the present invention provides an intrusion detection device utilizing an infrared laser and a detector means sensitive to infrared radiation which includes a plurality of detector means and a reflected beam deflecting means which deflects the reflected beam onto a specific detector determined by the distance from the device at which the beam has been reflected by the field of view.

Still further, the present invention provides an intrusion detection device which comprises a head member carrying a plurality of infrared radiation emitters arranged to project successive pulses of infrared beams of radiation onto a plurality of fields of view from the head member. A plurality of infrared radiation receiving means are arranged to accept reflected radiation of the successive pulses of the radiation beams reflected from the field of view. The receiving means and the emitters are arranged in cooperating pairs with each emitter-receiving means pair arranged to include the same field of view and with each cooperating pair arranged to view a different field from other cooperating pairs. Each of the receiving means comprises means for directing the reflected light onto an array of photosensors responsive to infrared light. The photosensors are arranged to generate a signal indicative of the distance from the device at which the pulse of the beam from the cooperating emitter has been reflected by the respective field of view during a selected time period. The device includes means for storing a reference signal which is indicative of the distance of reflection of the beam from the respective field of view during a reference time period. Means is also provided for comparing a signal from a selected time period for that receiving means with the reference signal and for generating an output signal if the selected signal differs from the reference signal in a preselected manner.

Various means for practicing the invention and other features and advantages thereof will be apparent from the following detailed description of illustrative preferred embodiments of the invention, reference being made to the accompanying drawings.

DETAILED DESCRIPTION OF THE PREFERRED EMBODIMENTS

Figure 1:
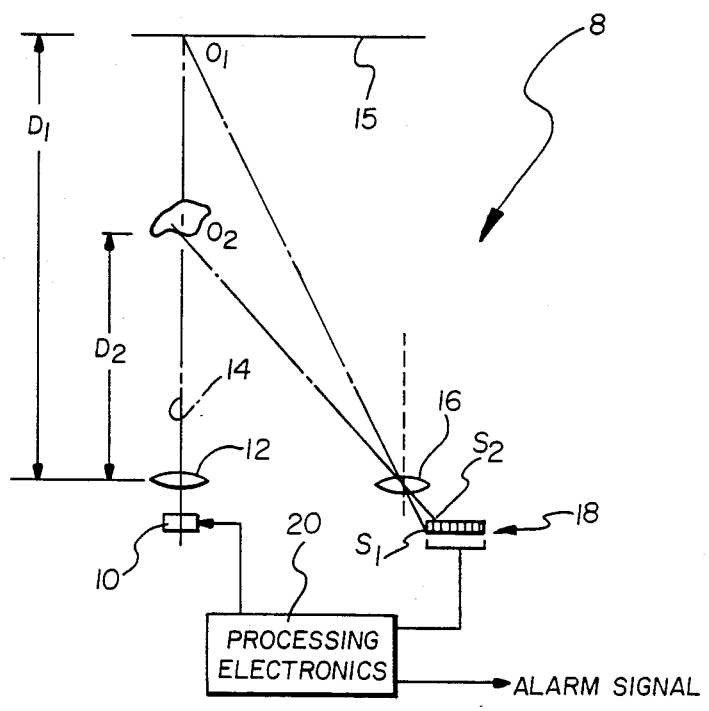
FIG. 1 is a schematic illustration of a preferred embodiment of the intrusion detection apparatus of the present invention.

A schematic illustration of an intrusion detection device according to the present invention is illustrated in FIG. 1. In this device, a beam of light is projected into the area or space to be protected, the field of view of the device, and, where the field of view if bounded by a periphery, such as a wall, fence, or the floor, a spot of light is illuminated and an image sensor detects the location of the spot in the image of the field of view to determine the distance to the spot.

The general arrangement of elements and the mode of operation of such an intrusion detection device 8 is described with respect to FIG. 1. As illustrated therein, means for projecting a beam of light, such as a light emitting diode (LED) 10 is provided with an associated lens 12 for projecting a beam of light into the field of view of the device. Preferably, the diode 10 emits an infrared beam; more particularly, the diode is an infrared laser diode which produces an intense, coherent beam of infrared radiation. (If the beam is generated by a collimated or highly directional source, lens 12 may not be necessary.) The beam is projected along a path 14 to illuminate a spot $O_1$ on a bounding peripheral wall 15. The scene is imaged by a second lens 16 onto a light detector means such as an array of photosensors 18 which, in the preferred embodiment, are responsive to infrared radiation. The lens 16, or a comparable light diverting means such as a mirror or holographic element, diverts the reflected beam onto a specific photosensor determined by the distance from the device at which the beam has been reflected. The signals produced by the photosensors are analyzed by processing electronics 20 to determine the distance from the device that the beam has been reflected by the field of view. The processing electronics then produce a signal representing the distance from the device to the object. As illustrated by example in FIG. 1, the apparent position of the illuminated spot in the field of view is a function of the distance along light path 14 to the object. For an object $O_1$ located at a distance $D_1$ from the intrusion detection device, the image of the illuminated spot will fall on the sensor array at location $S_1$. For an object $O_2$ at a closer distance $D_2$, the image of the spot will fall on the sensor array at location $S_2$. By examining the output of the sensor array, the processing electronics 20 determines, for example, by comparing the outputs of the elements to determine which output is at a maximum, the location of the illuminated spot in the field of view and thereby the distance from the intrusion detection device to the object. The distance signal generated is then transferred to a comparator (which may be incorporated in the processing electronics 20) which compares a selected (current) distance signal with a reference signal which has been previously stored in a memory. If the comparator determines that the selected signal differs from the reference signal in a predetermined manner, then an output or alarm signal is generated.

Figure 2:
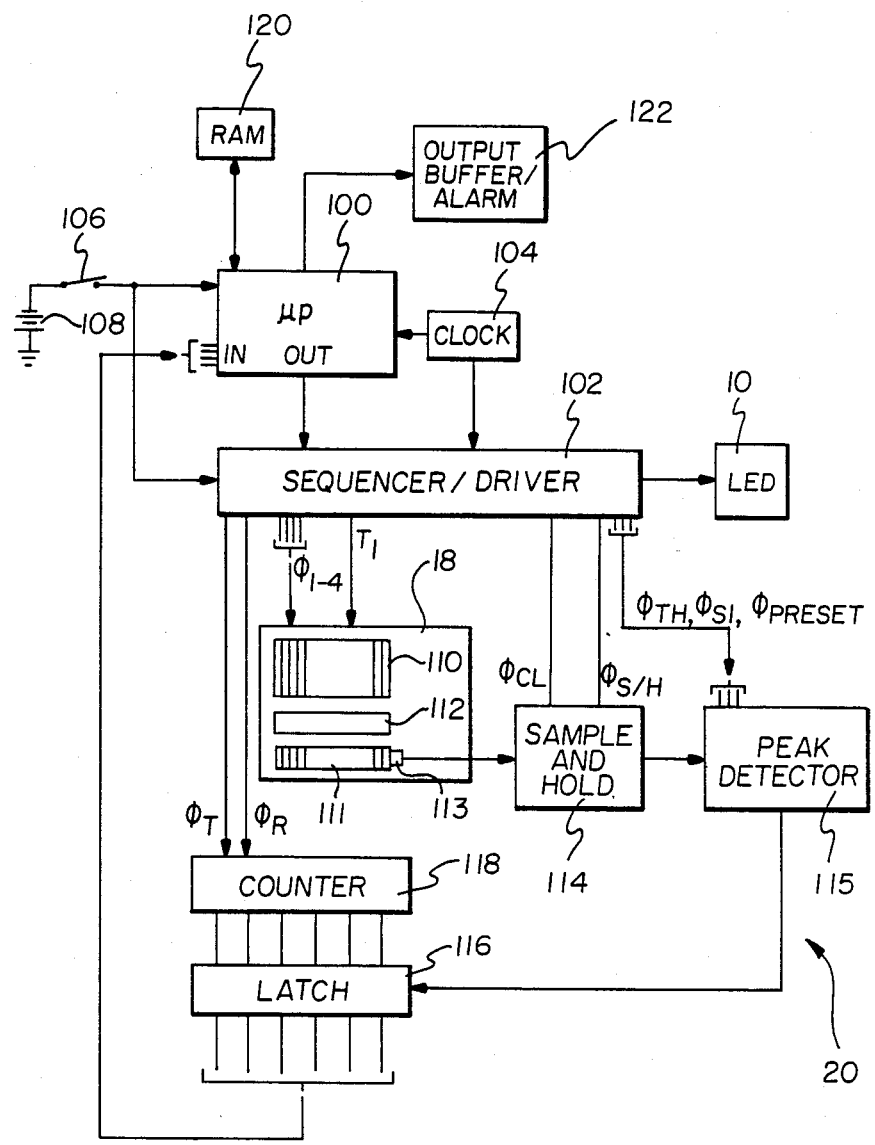
FIG. 2 is a schematic diagram of an electrical circuit embodiment of the apparatus illustrated in FIG. 1.

Referring now to FIG. 2, the processing electronics 20 of the intrusion detection device is illustrated in a more detailed manner. The overall control of the intrusion detection device is provided by a programmed microprocessor 100 via a sequencer driver circuit 102. The microprocessor 100 is supplied with a master clock signal from a clock circuit 104 and with power via a main power switch 106 from a source, such as battery 108. The image sensing portion of the intrusion detection device includes a serially scanned linear image sensor 18 of the type having an array of photosensors 110 and means for serially addressing the photosensors such as a CCD shift register 111. Such serially scanned linear image sensors are readily available commercially and generally require a transfer signal $T_1$ to actuate a transfer gate 112 to transfer photosignals generated in the photosensors in parallel to the shift register 111, and a multiphase (e.g. 4-phase) clock signal $\phi_{1-4}$ to cause the CCD shift register to deliver the photosignals serially to an output diode 113. The 4-phase clock signals $\phi_{1-4}$ and the transfer signal $T_1$ are supplied to the linear sensor array 110 from sequencer/driver 102 to produce output signals from the CCD shift register 111. The signals from the CCD shift register are sampled by sample and hold circuit 114 and are supplied to peak detector circuit 115 that produces a pulse each time a photosignal larger than any previous photosignal is received from image sensor 110. The output of the peak detector circuit is supplied to a latch circuit 116. Latch circuit 116 is connected to the outputs of the digital counter 118. Counter 118 receives a reset signal $\phi_R$ and a timing signal $\phi_T$ having a frequency related to the 4-phase clock signals $\phi_{1-4}$. The output of the latch circuit 116 is supplied to an input port of microprocessor 100. The driver circuit 102 also powers an LED 10 in the beam forming portion of the intrusion detection device. The microprocessor 100 is also connected to a RAM memory device 120 and to an output buffer/alarm device 122. Much of the rangefinding portion of the present invention is taught in U.S. Pat. Nos. 4,521,106; 4,527,891; 4,490,036 and 4,490,037, all of which are incorporated herein by reference.

Figure 3:
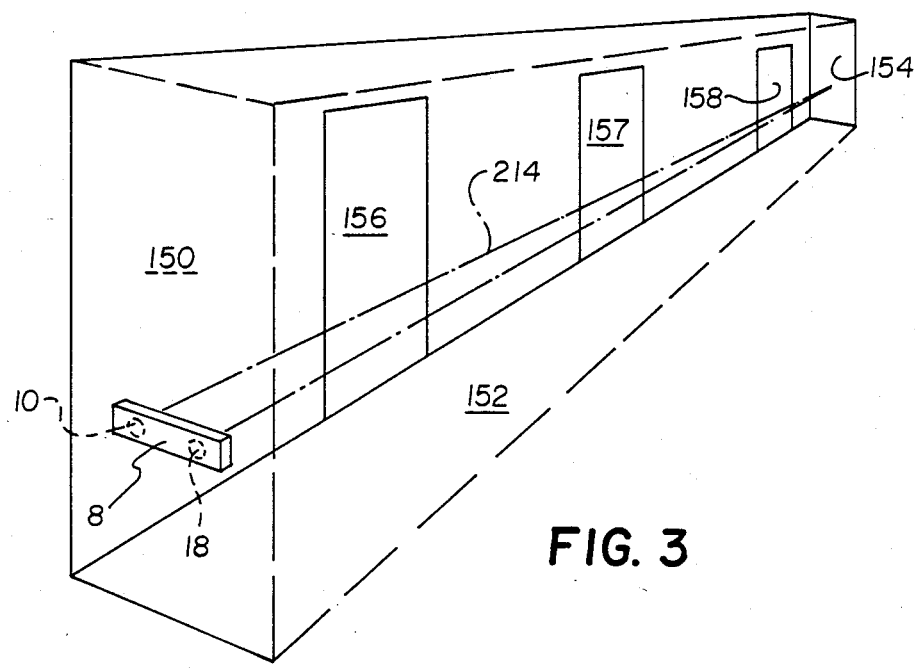
FIG. 3 is a schematic illustration of the application of the intrusion detection apparatus of the present invention.

The operation of the intrusion detection device of the present invention will now be illustrated with reference to FIGS. 1, 2 and 3. In FIG. 3, the intrusion detection device 8 containing the LED 10 and the array of photosensors 18 is mounted, for example, on an end wall 150 of a corridor 152. The intrusion detection device is aimed along the length of the corridor 152 towards an opposite wall 154 past plurality of access openings such as doorways 156–158. The LED 10 and its associated lens 12, project a beam of light 214 into the field of view, in this case the corridor 152, towards the wall 154 where it illuminates a spot which is then imaged by the lens 16 associated with the array of sensors 18. The signals produced by the photosensors are then analyzed by the microprocessor 100 and, during an initial reference time period, are fed as distance signals into the RAM 120 as a reference distance signal. Thereafter, as the intrusion detection device is operated, the sequencer/driver 102 generates a signal activating the LED 10 to produce a beam of light periodically to be projected into the field of view of the device. As the output of the peak detector circuit 115, resulting from the outputs of the photosensors for the corresponding time frame, is transferred into the microprocessor 100, a distance signal is generated based upon the signal received. Each distance signal for a time period is compared with the reference signal stored in the RAM 120. If the selected (current) distance signal is determined by the comparator to differ from the reference distance signal stored in the RAM in a predetermined manner, a signal is transferred to the output buffer/alarm 122 which then indicates that something has changed the distance signal received by the intrusion detection device. For example, should an entry be made into corridor 152 through doorway 157, the reflected spot from the intruder is analyzed by the microprocessor to indicate that the distance from the intrusion detection device to the reflected spot is now the distance from the device to doorway 157, rather than the distance from the device to wall 154. Inasmuch as this distance differs from the reference distance an alarm signal is provided to device 122. The advantage of the intrusion detection device of the present invention is that it provides more information than the mere fact that an intrusion has occurred; it indicates where the intrusion has occurred. Thus, should it be desired to monitor only doorways 157 and 158, the microprocessor comparator can be programmed to ignore distance signals equivalent to entry through doorway 156, and when such a distance signal is received no alarm signal will be produced to device 122.

A specific example of a preferred embodiment of the present invention utilizes an infrared laser diode (LD) having a power of 30 milliwatts and an effective pulse width of 250 microseconds. The laser diode output has a spectral peak at approximately 830 nanometers. The emitter lens 12 has a focal length of 36 millimeters, a transmittance of 0.92, and an f-number equal to 1.0. The receiver lens is identical to the emitter lens. The received signal is projected by lens 16 onto an array of photodiodes 18 having, for example, 28 elements. The receiver lens may be provided with a narrow band filter to limit the light received to generally the same band as projected by the emitter. An image sensor particularly adapted for use in a rangefinder, including means for removing the background signal from the photosignals produced by the photosensors, leaving only photosignals due to the illuminated spot, is disclosed in U.S. Pat. No. 4,490,037, the disclosure of which is incorporated herein by reference. The CCD shift register 111 is preferably provided with two CCD pixels for each photosensor. One of the pixels is arranged to store the charge developed during an ambient only measurement, while the other pixel stores the charge developed by the ambient plus the LD signal measurement performed during the activation of the LD. The sample and hold circuit 114 is arranged to subtract the ambient charge from the signal plus ambient charge to generate an output signal representing the infrared generated by the laser diode only. This increases the signal-to-noise ratio of the device over that possible should both ambient and LD generated signal charge be handled together. Only the infrared signal alone is sent to the peak detector 115 for generating the distance signal.

ALTERNATIVE EMBODIMENTS

Figure 4:
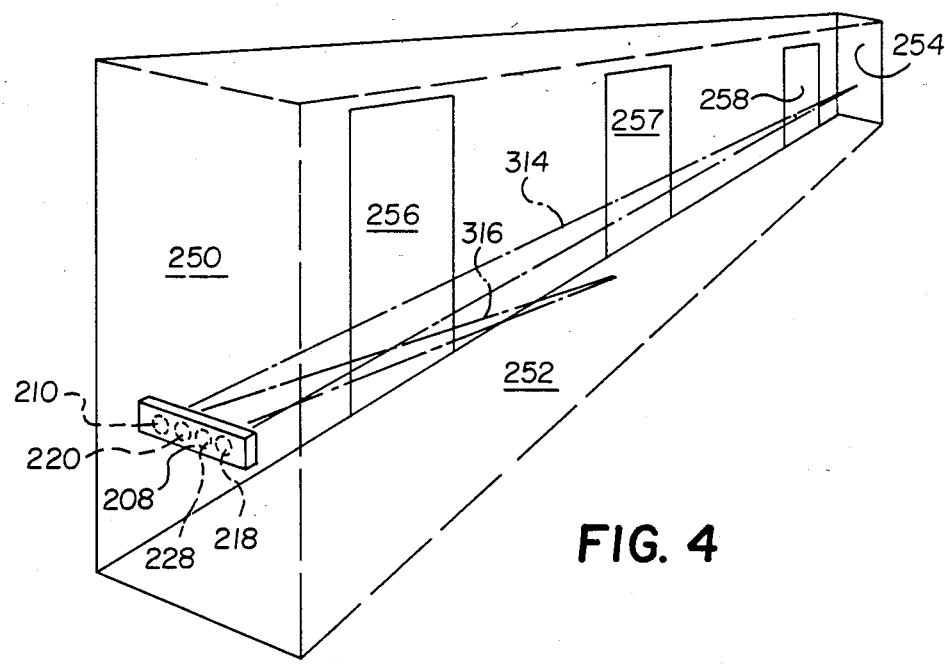
FIG. 4 is a schematic illustration of the application of an alternative embodiment of the intrusion detection apparatus of the present invention.

An alternative embodiment of the present invention is illustrated in FIG. 4 and comprises an intrusion detection device head member 208 mounted similarly to that illustrated in FIG. 3, on an end wall 250 of a corridor 252. The head member 208 includes at least two infrared radiation emitters 210 and 220, similar to the LD emitter 10 described with respect to the preferred embodiment. The emitters in this embodiment are arranged to project successive pulses of infrared beams of radiation from the device down the corridor 252 towards the opposite end wall 254. In this embodiment, the beams of radiation are projected onto a plurality of fields of view from the head member. Specifically, the emitter 210 emits an infrared beam 314 toward the opposite end wall 254. The emitter 220 projects a beam of infrared radiation 316 toward the floor of the corridor midway between end walls 250 and 254. The intrusion detection head member 208 is also provided with a pair of infrared radiation receiving means 218 and 228 which are arranged to receive reflected radiation of the successive pulses of the infrared beams reflected from the fields of view. Each of the receiving means 218 and 228 is disposed a predetermined spaced distance from the corresponding emitters 210 and 220 and are arranged in cooperating pairs, with each emitter-receiving means pair arranged to include the same field of view, and with each cooperating pair arranged to view a different field from the other cooperating pair. Each of the receiving means is arranged to provide a signal indicative of the distance from the device at which the pulse of the beam from the corresponding emitter has been reflected by the respective field of view. Thus, a signal from each receiver is provided to the microprocessor for comparison with a reference signal for that field of view in a manner substantially like that described hereinabove.

Such a device as that illustrated in FIG. 4 is useful for monitoring an area having a distance that exceeds the range of a single emitter-receiving means pair. For example, if the corridor 252 were sufficiently long, a beam which was projected towards the far wall and a receiver means which would sense the spot of light reflected from that wall would not accommodate all of the possible points of reflection from the very near to the very far. In other words, if a cooperating pair focussed on a distant field of view received a signal from very close to the emitter, the returning signal might be deflected by the lens 16 off the right end of the photosensor array. Thus, the nearer field of view is monitored by the second emitter-receiving means pair 220, 228 which is focussed on a closer field of view.

Still another application of a device including multiple cooperating pairs of emitters and receiving means is in the situation where one area of a field of view is more sensitive to an intrusion and thus would benefit from the use of overlapping beams of radiation to assure the detection of any intruder in that particular area.

According to another alternative embodiment, each cooperating pair of emitter-receiving means is arranged to view a field of view other than a field of view viewed by another of the cooperating pairs. In a further alternative embodiment, each cooperating pair views a field which partially overlaps the field of view viewed by another cooperating pair.

According to still another embodiment of the present invention, the comparator portion of the microprocessor 100 is arranged to compare signals from the same cooperating pair and from a cooperating pair viewing an adjacent field of view.

In another alternative embodiment, the reference signal stored in the RAM 120 is a signal selected from a previous time period in the operation of the device. In some instances it may be desirable to select the previous time period from the next preceeding time period so that the reference signal is continuously updated and an alarm signal is only generated if several sequential time periods each contain a different distance signal for that cooperating pair.

The present invention thus provides an intrusion detection device which not only senses an intruder entering the protected space, but provides the additional information of the distance from the detector at which the intrusion has occurred. Furthermore, the present device provides the desired sensitivity without the undesirable false alarms often attributable to prior art intrusion detection devices. Moreover, the present invention provides a system comparable in its capabilities to a radar-based system at a fraction of the cost of such radar systems. Still further, the present invention provides an intrusion detection device that can be used in the uncontrolled environment of the out-of-doors without the disadvantages often attributable to intrusion detection devices of the prior art.

The invention has been described in detail with particular reference to a presently preferred embodiment, but it will be understood that variations and modifications can be effected within the spirit and scope of the invention.

What is claimed is:

1. An intrusion detection device comprising a radiation emitter arranged to project a beam of infrared radiation toward a field of view, means for receiving the reflected radiation of said beam reflected from said field of view, said beam receiving means including a deflecting means and a plurality of detector means, said deflecting means being arranged to divert said reflected beam onto a specific detector means determined by the distance from said device at which said beam has been reflected by said field of view, said receiving means arranged to generate a signal indicative of the distance from said device at which said beam has been reflected by said field of view during a selected time period, means for storing a reference signal which is indicative of the distance of reflection of said beam from said field of view during a reference time period, means for comparing said signal from said selected time period with said reference signal, and means for generating an output signal if said signal is different from said reference signal.

2. The invention according to claim 1 wherein said radiation emitter comprises a light emitting diode.

3. The invention according to claim 1 wherein said radiation emitter comprises a laser.

4. The invention according to claim 1 wherein said radiation emitter comprises a laser diode.

5. The invention according to claim 1 including a plurality of emitters and a plurality of receiving means arranged in cooperating pairs wherein at least one cooperating pair is arranged to view a different field from a field of view viewed by another of said cooperating pairs.

6. The invention according to claim 5 wherein each cooperating pair views a field of view other than a field of view viewed by another of said cooperating pairs.

7. The invention according to claim 5 wherein each cooperating pair views a field which partially overlaps the field of view of another cooperating pair.

8. The invention according to claim 5 including means for comparing signals which is arranged to compare signals from the same cooperating pair and from a cooperating pair scanning an adjacent field of view.

9. The invention according to claim 1 wherein said reference signal is a signal selected from a previous time period.

10. The invention according to claim 9 wherein said previous time period is the next preceeding time period.

11. An intrusion detection device comprising a head member which includes a plurality of infrared radiation emitters arranged to project successive pulses of infrared beams of radiation from said device, said beams of radiation being projected onto a plurality of fields of view from said head, a plurality of infrared radiation receiving means arranged to accept reflected radiation of said successive pulses of said infrared beams reflected from said fields of view, said plurality of receiving means and emitters being arranged in cooperating pairs with each emitter-receiving means pair arranged to include the same field of view and with each cooperating pair arranged to view a different field from other cooperating pairs, each of said receiving means comprising means arranged to direct the reflected radiation onto an array of photosensors responsive to infrared radiation, said photosensors being arranged to generate a photosignal related to the quantity of infrared radiation falling thereon, each of said receiving means arranged to generate a signal indicative of the distance from said device at which the pulse of said beam from the cooperating emitter has been reflected by the respective field of view during a selected time period, means for storing a reference signal which is indicative of the distance of reflection of said beam from said respective field of view during a reference time period, means for comparing said signal from said selected time period for that receiving means with said reference signal, and means for generating an output signal if said signal differs from said reference signal in a preselected manner.

12. The invention according to claim 11 wherein said array of photosensors includes a plurality of detector means and a deflecting means whereby said deflecting means diverts said reflected beam onto a specific detector means determined by the distance from said device at which said beam has been reflected by said field of view.

13. The invention according to claim 11 wherein means is provided for sensing the amount of ambient radiation falling on said photosensors and for sensing the amount of ambient radiation plus the pulse of radiation falling thereon, and means for subtracting the two amounts to derive the amount of pulse radiation sensed.

14. The invention according to claim 11 wherein said radiation emitter comprises a laser.

15. The invention according to claim 11 wherein said radiation emitter comprises a laser diode.

16. The invention according to claim 11 wherein lens means diverts said reflected radiation onto a specific photosensor determined by the distance from said device at which said beam has been reflected by said field of view.

17. The invention according to claim 11 wherein each of said photosensors includes a charge coupled device.

18. The invention according to claim 11 wherein each cooperating pair views a field of view other than a field of view viewed by another of said cooperating pairs.

19. The invention according to claim 11 wherein each cooperating pair views a field which partially overlaps the field of view viewed by another cooperating pair.

20. The invention according to claim 11 wherein said means for comparing signals is arranged to compare signals from the same cooperating pair and from a cooperating pair viewing an adjacent field of view.

21. The invention according to claim 11 wherein said reference signal is a signal selected from a previous time period.

22. The invention according to claim 21 wherein said previous time period is the next preceeding time period.

23. The invention according to claim 11 including an optical filter associated with the receiving means to reduce the quantity of ambient radiation reaching said receiving means.

* * * * *